United States Patent Office 3,205,023
Patented Sept. 7, 1965

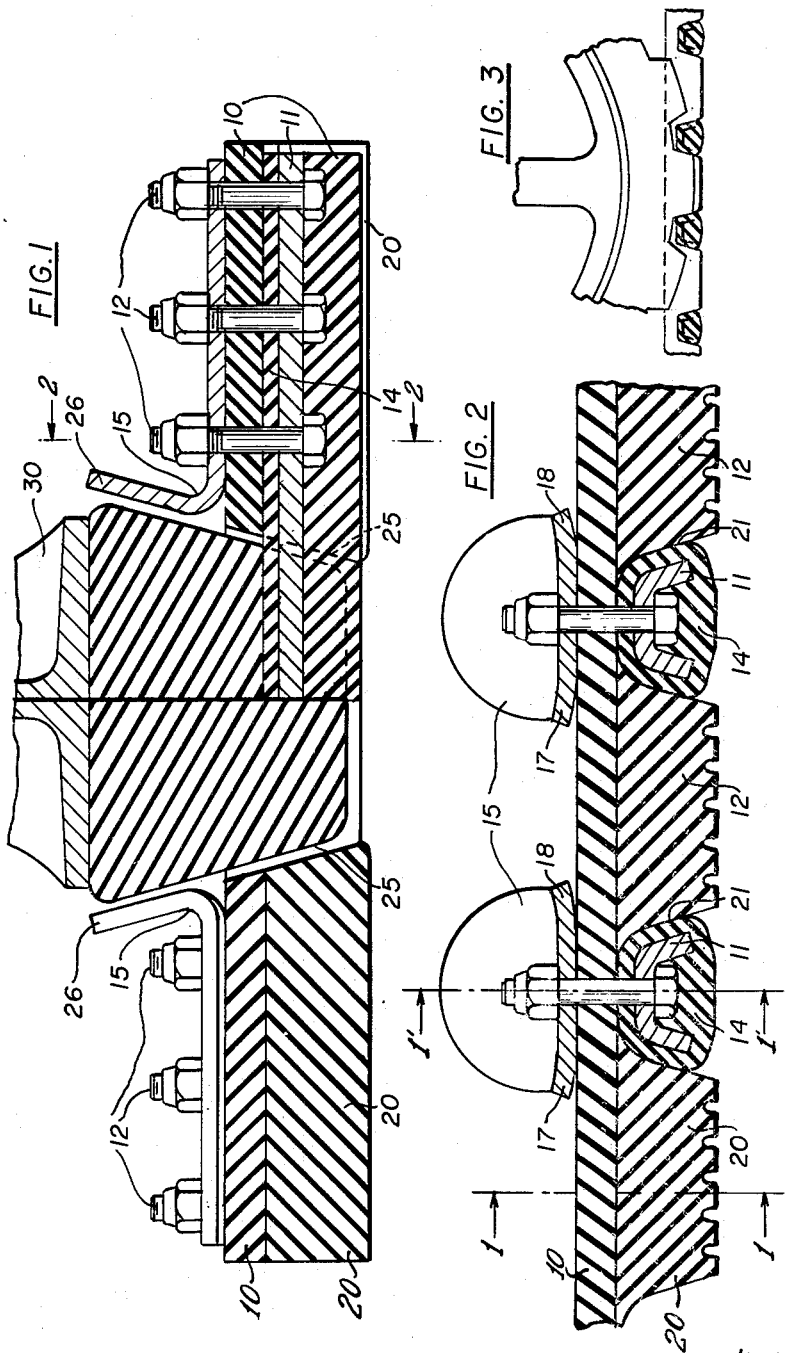

3,205,023
ENDLESS TRACK FOR VEHICLE
Bruce Nodwell, Calgary, Alberta, Canada, assignor to Robin-Nodwell Mfg., Ltd., Calgary, Alberta, Canada
Filed Dec. 5, 1963, Ser. No. 328,417
Claims priority, application Canada, Dec. 6, 1962, 863,909
2 Claims. (Cl. 305—38)

The present invention relates to endless tracks for vehicles and more particularly to endless tracks of the type known as ladder tracks in which each track comprises a pair of endless belts arranged side by side and joined together by transversely extending hardened metal grouser bars. The belts are sprocket driven simultaneously through their common grouser bars.

One of the disadvantages of endless tracks of this type is that the metal grouser bars dig into, and cause damage to a highway surface if the tractor vehicle is driven along the highway.

The present invention provides ground engaging pads on the belts which extend out beyond the grouser bars so that the tractor vehicle may run, under normal conditions, along a highway on the pads without causing damage to the highway by its grouser bars.

The grouser bars may be of the type described in my co-pending application Ser. No. 835,621 now Patent No. 3,006,679 and the pads are preferably dimensioned so as to accommodate for them.

According to a feature of the invention the grouser bars are retained on the belts by cooperation of bolts and backing plates, which plates have inwardly turned leading and trailing edges, the arrangement facilitating the distribution of the weight of the vehicle on the pads and permitting of the free running of the belts about a drive sprocket.

The following is a description by way of example of one embodiment according to the present invention reference being had to the accompanying drawings, in which:

FIGURE 1 is a sectional end view of an endless track at the point of engagement with a drive sprocket looking along the running axis of the track, the portion to the right of the line 2, 2 being a section on the line 1', 1' and the portion to the left of the line 2, 2 being a section on the line 1", 1" of FIGURE 2; and FIGURE 2 is a section on the line 2, 2 of FIGURE 1 with the sprocket wheel removed.

FIGURE 3 is a part view showing the sprocket wheel engagement with the belt.

Turning now to the drawings, an endless track of a twin tracked vehicle comprises a pair of endless belts 10 extending longitudinally of the vehicle and connected together by a plurality of grouser bars 11. The grouser bars 11 are attached to each of the belts 10 by means of a plurality of bolts 12 which engage on the outside of the grouser bars 11 and on the inside of belt backing plates 15 so that the belt 10 is pinched, sandwich fashion between grouser bar and backing plate. The grouser bars may, if desired, be encased in a resilient composition 14 in the manner described in my aforementioned patent application Ser. No. 835,621 and the backing plates 15 are arranged in pairs in transverse alignment above each grouser bar.

Each of the backing plates 15 have inturned leading and trailing edges 17 and 18 which permit the desired degree of flexibility of the belt when passing around a drive sprocket.

Arranged on each belt and extending outwardly therefrom on the ground engaging side thereof are a plurality of ground engaging pads 20.

The pads in each belt of the track are transversely aligned and they form with the endless belts 10 a plurality of recesses 21 in which the grouser bars 11 reside. The pads may be individual, or additions to the belt as continuous strips.

The backing plates 15 are made sufficiently wide in the longitudinal direction so that they span, between leading and trailing edges, the grouser bar and distribute the load on to the pads immediately adjacent in front and behind of each individual grouser bar. It will be seen from the drawings that the depth of the pad 20 is such that, under normal loading, it will engage the ground so that the grouser bar, even when provided with resilient covering 14, does not touch the ground. In this manner the tracked vehicle is enabled to proceed under its own power along a highway, the pads engaging the highway in a similar manner to the tires of wheeled vehicles and the grouser bars not engaging the road surface. In this manner damage to the road surface by the grouser bars is avoided.

It will be obvious that normal loading conditions will not always prevail and therefore it is preferred to surround the grouser bars with the covering 14 aforementioned.

From FIGURE 1 it will be observed that the pads 20 are cut back to provide sloping faces 25 and the ends 26 of the backing plates 15 are bent so that the drive sprocket 30 may engage the grouser bar 11 quite freely and without fouling the pads 20 or the backing plates 15.

What I claim as my invention is:

1. An endless ladder type track comprising a pair of endless belts arranged in side by side spaced relationship, a plurality of grouser bars transversely arranged and longitudinally spaced about the track uniting the belts together, a plurality of ground engaging pads on the ground engaging side of each of the endless belts located in longitudinally spaced transversely aligned relationship between the said grouser bars and extending outwardly of the belts to a distance greater than the extension of the grouser bars; and a plurality of backing plates arranged in pairs, one of each pair being located on each belt and each pair aligned above each grouser bar and means for attaching each grouser bar to its associated pair of backing plates; which backing plates are dimensioned so as to longitudinally span that grouser bar sufficiently to transmit load to the immediately adjacent pads.

2. A device as claimed in claim 1 in which each backing plate has inwardly curled leading and trailing edges.

References Cited by the Examiner

UNITED STATES PATENTS

| 2,515,128 | 7/50 | Lammertse | 305—38 |
| 2,749,189 | 6/56 | France et al. | 305—35 |

FOREIGN PATENTS

| 633,211 | 12/61 | Canada. |
| 764,824 | 1/57 | Great Britain. |
| 781,165 | 8/57 | Great Britain. |

ARTHUR L. LA POINT, *Primary Examiner.*